US009806933B2

(12) United States Patent
Bhakar et al.

(10) Patent No.: US 9,806,933 B2
(45) Date of Patent: *Oct. 31, 2017

(54) COMPONENT LOADING BASED ON USER INTERACTIONS

(71) Applicant: Microsoft Corporation, Redmond, WA (US)

(72) Inventors: Gautam Bhakar, Redmond, WA (US); Kevin Christopher Clement, Redmond, WA (US); Kenneth Ping-Kuen Chau, Renton, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

This patent is subject to a terminal disclaimer.

(21) Appl. No.: 13/918,628

(22) Filed: Jun. 14, 2013

(65) Prior Publication Data

US 2014/0280574 A1    Sep. 18, 2014

Related U.S. Application Data

(60) Provisional application No. 61/779,126, filed on Mar. 13, 2013.

(51) Int. Cl.
*G06F 15/16* (2006.01)
*H04L 29/06* (2006.01)
*G06F 9/445* (2006.01)
*H04W 4/00* (2009.01)

(52) U.S. Cl.
CPC .......... *H04L 29/06* (2013.01); *G06F 9/44521* (2013.01); *H04W 4/001* (2013.01)

(58) Field of Classification Search
CPC ......... H04L 29/06; H04L 12/00; H04L 49/00; H04L 63/08; G06F 9/44521; H04W 4/001
USPC .................................................. 709/204-245
See application file for complete search history.

(56) References Cited

U.S. PATENT DOCUMENTS

| 2006/0123346 | A1* | 6/2006 | Totman | G06F 17/24 715/748 |
| 2006/0259585 | A1* | 11/2006 | Keohane | G06F 17/30899 709/219 |
| 2008/0148242 | A1* | 6/2008 | Cobb | G06F 11/3466 717/130 |
| 2008/0256478 | A1* | 10/2008 | Bromley | G05B 19/0423 715/772 |
| 2008/0263192 | A1* | 10/2008 | Murphy | G06F 17/30067 709/223 |
| 2009/0259585 | A1* | 10/2009 | Beirne | G06Q 40/025 705/38 |

(Continued)

*Primary Examiner* — David Lazaro
*Assistant Examiner* — Berhanu Shitayewoldetsad

(57) ABSTRACT

Provided herein are systems, methods, and software for implementing information management applications. In an implementation, an application embodied in program instructions stored on one or more computer readable storage media comprises components and a control component. The components communicate requests to invoke others of the components. The control component handles the requests by at least determining whether or not any component identified by the requests has already been downloaded or is yet to be downloaded. The control component invokes the component when already downloaded and retrieves the component when not yet downloaded.

20 Claims, 6 Drawing Sheets

(56) References Cited

U.S. PATENT DOCUMENTS

| | | | |
|---|---|---|---|
| 2010/0115613 A1* | 5/2010 | Ramaswami | G06F 17/30902 726/22 |
| 2011/0106916 A1* | 5/2011 | Cho | G06F 9/5027 709/219 |
| 2012/0120799 A1* | 5/2012 | Brisebois | H04W 4/001 370/231 |
| 2014/0310395 A1* | 10/2014 | Chakra | H04L 67/02 709/224 |

* cited by examiner

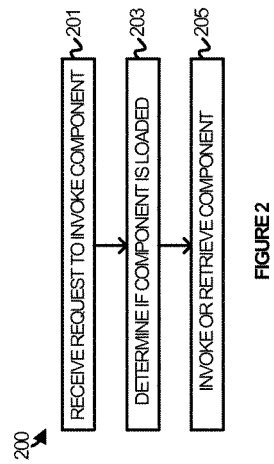

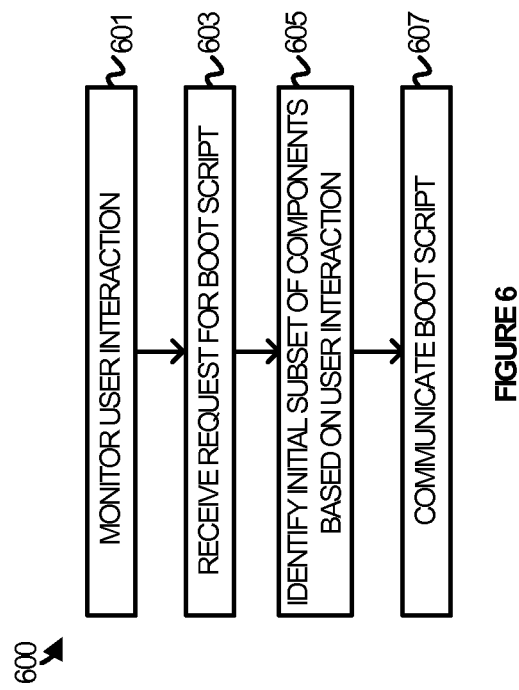
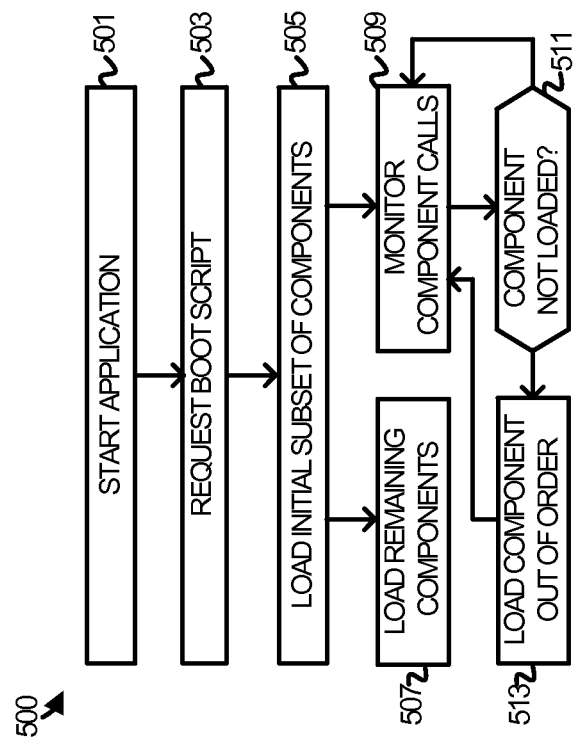

COMPONENT LOADING BASED ON USER INTERACTIONS

RELATED APPLICATIONS

This application claims the benefit of and priority to U.S. Provisional Patent Application No. 61/779,126, filed on Mar. 13, 2013, and entitled "DYNAMIC COMPONENT LOADING," which is hereby incorporated by reference in its entirety.

TECHNICAL FIELD

Aspects of the disclosure are related to computing hardware and software technology, and in particular to information management applications.

TECHNICAL BACKGROUND

Information management applications provide users with effective and convenient ways to communicate with others and manage their information. Examples of information management applications include but are not limited to email applications and calendar applications. Some information management applications integrate these various types of applications by way of modules, such as email, calendar, contact, and task modules, although each type of application or functionality may also be provided in a stand-alone manner. Microsoft® Outlook® is one example of an information management application.

While many information management applications are provided as locally installed and executed applications, many can be experienced in a wide variety of ways. For example, some information management applications are available as web-based applications that are experienced through a browser application, as mobile applications customized for mobile environments, or even as a mobile web-based application generally developed for a mobile browser experience. In addition, information management applications can be experienced on a wide variety of computing devices, such as desktop, laptop, or tablet computers, mobile phones, gaming systems, Internet appliances, or any other physical or virtual computing system, variation, or combination thereof.

In some scenarios, an information management application is first loaded into an execution environment, such as a web browser running on a computing device, before a user can begin to interact with it. In some cases an entire module, such as an email or calendar module, must be loaded before any of its components can be used. In other cases all of the modules must be loaded before any module or component can be used.

For example, a web-based version of an information management application may be invoked, triggering the loading of its components within a browser or other similar environment. A splash screen or other delay feature may be presented that keeps a user from interacting with the application until all of its components or modules are loaded. This degrades the user experience in general and can lead to some operational errors if the loading process is compromised or inhibited in some manner.

One benefit of loading all of the components of an application into an execution environment is that, once all of the components are loaded, interaction with any given aspect of the application may be fast and responsive. For example, a user may click on a contact from within a view of an email. In response to selecting the contact, a contact card can be displayed that includes information about the contact and various elements that can be selected to access various features and functionality. By loading all of the components associated with the elements in the contact card without restraint, the features and functionality can be experienced without significant delay. But as mentioned above, such a technique can degrade the user experience with respect to the application.

Overview

Provided herein are systems, methods, and software for implementing information management applications in which an initial set of components in an application are identified for loading prior to other components based at least in part on user interaction with the application. In this manner, specific aspects of an application can be loaded before others that may be less relevant to a user, thereby enhancing the user experience.

In at least one implementation, an information management application interfaces with an information exchange service and, upon starting, communicates a request to the information exchange service to identify an initial subset of various components based at least in part on user interaction with the information management application. In response to the information exchange service identifying the initial subset of components, the information management application loads the initial subset of components into an execution environment. In some implementations, the execution environment comprises a browser.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an operational scenario in an implementation.

FIG. 2 illustrates a control process in an implementation.

FIG. 3 illustrates a computing architecture in an implementation.

FIG. 5 illustrates a loading process in an implementation.

FIG. 6 illustrates an exchange process in an implementation.

TECHNICAL DISCLOSURE

Figure 4:
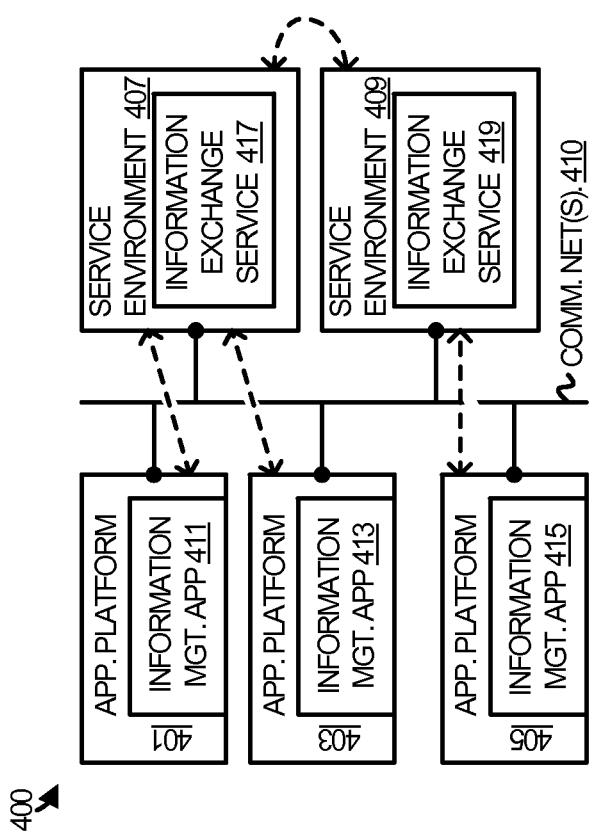
FIG. 4 illustrates a communication environment in an implementation.

Implementations disclosed herein include information management applications that load components in a user-specific manner to enable faster and more responsive user experiences. Rather than load all of the components upon starting the application, an initial set of the components may be identified for early loading ahead of a remaining set of the components. The initial set may be identified based on a variety of factors, such as prior user behavior or interaction patterns with respect to the application. For example, if a user typically interacts first with an email module, then components associated with the email module may be included in the initial set. A variety of factors may be considered and a variety of subsets may be identified.

During an initial period upon the application being invoked, the initial set of components are loaded from the staging environment, such as a web server or browser cache, and loaded in the local environment for execution. Any of the components may then be executed. In the meantime, the gradual loading of a remaining set of the components may commence. The loading of the remaining set may occur in accordance with a loading order. Thus, as any component in the remaining set is loaded, it too may be executed.

At any given time, any of the components may make a request to invoke any other component, whether the requested component is loaded yet or not. In addition, the requested component can be one of the initial set or one of the remaining set.

Regardless, a control component handles the requests by determining whether or not the requested component is loaded yet. If so, the requested component can be called and executed. If not, the control component initiates a process to retrieve and load the requested component. In some scenarios, the requested component may be retrieved ahead of its scheduled place in the loading order.

In this manner, an application may be started and interaction by a user with it may commence earlier than in the past. In addition, should actions occur that invoke components not yet downloaded, the invoked components can be retrieved and loaded for execution. Any remaining items can be gradually retrieved and loaded.

Some implementations may also include a manager component that identifies based on user behavior an initial subset of the components to download from a staging environment to a local environment prior to any others of the components. The manager component may also identify, based at least in part on user behavior, the initial subset of the various components to load into the execution environment. The manager component could be implemented in an information management application, but may also be implemented as part of an information exchange service in a service environment. In some implementations the application comprises a web-based application that includes various application modules. In addition, in some implementations each of the components may be a user interface component associated with at least one of the application modules.

FIG. 1 illustrates an operational scenario 100 involving components of an information management application and an associated control component. In particular, operational scenario 100 involves controller 101. In operation, an initial set of components 103, 105, and 107 has been identified for loading during an initial loading period. Once the components are loaded in a local execution environment, they may be executed. Each component can be invoked by controller 101 for execution, at the completion of which control reverts back to controller 101.

In some cases, any of the components may request that another component be invoked. When this occurs, controller 101 employs a control process to determine how to handle the request. When the requested component is already loaded, controller 101 can request the component for execution. If the requested component is not already loaded, controller 101 can retrieve the component for loading and execution.

In some situations the requested component may be one in a set of remaining components that have not yet been downloaded. With respect to operational scenario 100, components 109, 111, and 113 are representative of one such set. In addition, components 109, 111, and 113 are arranged in an order to represent a loading order. In other words, component 109 is scheduled for loading first, followed by component 111, and then component 113.

However, in some cases, any of the components may be requested by components already loaded and executing in the local environment. Accordingly, controller 101 may retrieve the component ahead of its place in the loading order. FIG. 1 illustrates such an occurrence by way of the retrieval of component 111 ahead of component 109.

FIG. 2 illustrates a control process 200 representative a process that may be employed by controller 101 or any other control module or element. In operation, a request is made by an executing component that identifies another component (step 201). For example, one component may call another. The call may be a direct call that is intercepted or otherwise examined by a controller, but it may also be a request that is directed to the controller. Other implementations are possible and may be considered within the scope of this disclosure.

The controller examines the request to determine how it should be handled, primarily by determining if the subject component is loaded yet or not (step 203). If the subject component is already loaded in the execution environment, then it can be invoked (step 205). If the subject component is not yet loaded, then the controller initiates a loading process by which the component is retrieved and loaded into the local environment for execution (step 205).

It may be appreciated from operational scenario 100 that controller 101 and its associated functionality enable an initial subset of components to be loaded prior to other components such that specific aspects of an information management application likely to be interacted with by a user are available. In addition, controller 101 provides flexibility by enabling other aspects to be made available quickly by loading other components out-of-order ahead of their place in a loading order.

It may also be appreciated that, while operational scenario 100 makes reference to identifying and loading an initial subset of components upon starting an application, such capabilities may also apply well after an application has started. In fact, control process 200 can be applied at any point during the operation of an application when loading components associated with a view, module, sub-module, or any other aspect of an application.

For example, a user may invoke a feature for which its associated components have not yet been loaded. Rather than load all of the components for the feature in a static or pre-programmed loading order, an initial subset of the components can be identified based on a user's past interaction with the feature. The initial subset can be loaded first, prior to at least some other components associated with the feature. In this manner, various aspects of the feature deemed especially relevant to the user based on his or her past interactions can be loaded before other aspects that may be less likely to be invoked in use.

Referring now to FIG. 3, computing architecture 300 is representative of an architecture that may be employed in any apparatus, system, or device, or collections thereof, to suitably implement all or portions of control process 200 illustrated in FIG. 2 or variations thereof, and optionally all or portions of the information management application referred to with respect to FIG. 1. Loading process 500 discussed with respect to FIG. 5 is an example of a variation of control process 200. Control process 200 may be implemented on a single apparatus, system, or device or may be implemented in a distributed manner. The information management application may also be implemented on a single apparatus, system, or device or may be implemented in a distributed manner. Control process 200 may be integrated with the information management application, but may also stand alone or be embodied in some other application.

While the present discussion focuses mainly on the suitability of computing architecture 300 for implementing control process 200 and information management applications in general, it may be appreciated that other uses are possible. For example, computing architecture 300 may also be suitable for implementing all or portions of an information exchange service in a service environment and any associated functionality or processes, as is noted below with respect to FIG. 4.

Computing architecture 300 may be employed in, for example, desktop computers, laptop computers, tablet computers, notebook computers, mobile computing devices, cell phones, media devices, and gaming devices, as well as any other type of physical or virtual computing machine and any combination or variation thereof. Computing architecture 300 may also be employed in, for example, server computers, cloud computing platforms, data centers, any physical or virtual computing machine, and any variation or combination thereof.

Computing architecture 300 includes processing system 301, storage system 303, software 305, communication interface system 307, and user interface system 309. Processing system 301 is operatively coupled with storage system 303, communication interface system 307, and user interface system 309. Processing system 301 loads and executes software 305 from storage system 303. When executed by processing system 301, software 305 directs processing system 301 to operate as described herein for control process 200 or its variations. Computing architecture 300 may optionally include additional devices, features, or functionality not discussed here for purposes of brevity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations, or variations thereof.

Storage system 303 may comprise any computer readable storage media readable by processing system 301 and capable of storing software 305. Storage system 303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 303 may also include communication media over which software 305 may be communicated internally or externally. Storage system 303 may be implemented as a single storage device but may also be implemented across multiple storage devices or sub-systems co-located or distributed relative to each other. Storage system 303 may comprise additional elements, such as a controller, capable of communicating with processing system 301 or possibly other systems.

Software 305 may be implemented in program instructions and among other functions may, when executed by processing system 301, direct processing system 301 to operate as described herein for control process 200. In particular, the program instructions may include various components or modules that cooperate or otherwise interact to carry out control process 200. The various components or modules may be embodied in compiled or interpreted instructions or in some other variation or combination of instructions. The various components or modules may be executed in a synchronous or asynchronous manner, in a serial manner or in parallel, in a single threaded environment or multi-threaded, or in accordance with any other suitable execution paradigm, variation, or combination thereof. Software 305 may include additional processes, programs, or components, such as operating system software or other application software. Software 305 may also comprise firmware or some other form of machine-readable processing instructions executable by processing system 301.

In general, software 305 may, when loaded into processing system 301 and executed, transform a suitable apparatus, system, or device employing computing architecture 300 overall from a general-purpose computing system into a special-purpose computing system customized to facilitate application loading as described herein for each implementation. Indeed, encoding software 305 on storage system 303 may transform the physical structure of storage system 303. The specific transformation of the physical structure may depend on various factors in different implementations of this description. Examples of such factors may include, but are not limited, to the technology used to implement the storage media of storage system 303 and whether the computer-storage media are characterized as primary or secondary storage, as well as other factors.

For example, if the computer-storage media are implemented as semiconductor-based memory, software 305 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing architecture 300 is generally intended to represent an architecture on which software 305 may be deployed and executed in order to implement control process 200 (or variations thereof) and optionally all or portions of an information management application. However, computing architecture 300 may also be suitable for any computing system on which software 305 may be staged and from where software 305 may be distributed, transported, downloaded, or otherwise provided to yet another computing system for deployment and execution, or yet additional distribution.

Communication interface system 307 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 309 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 309. In some cases, the input and output devices may be combined in a single device, such as a display capable of displaying images and receiving touch gestures. The aforementioned user input and output devices are well known in the art and need not be discussed at length here. User interface system 309 may also include associated user interface software executable by processing system 301 in support of the various user input and output devices discussed above. Separately or in conjunction with each other and other hardware and software elements, the user interface software and devices may support a graphical user interface, a natural user interface, or the like.

FIG. 4 illustrates a communication environment 400 in which various information management applications may implement control process 200 or variations thereof. Communication environment 400 includes application platform 401, application platform 403, and application platform 405. Application platform 401 and application platform 403 may communicate with service environment 407 to access information exchange service 417 on behalf of information management application 411 and information management application 413 respectively. Application platform 405 may communicate with service environment 409 to access information exchange service 419 on behalf of information management application 415. From time to time, service environment 407 and service environment 409 may communicate in furtherance of interaction between information exchange service 417 and information exchange service 419.

Examples of application platforms 401, 403, and 405, include, but are not limited to, desktop computers, work stations, laptop computers, notebook computers, tablet computers, mobile phones, personal digital assistances, media devices, gaming devices, and any other physical or virtual computing machine or combinations and variations thereof capable of implementing at least one of a variety of information management applications. Service environment 407 may be any computing system or collection of computing systems capable of implementing an information exchange service 417.

Application platforms 401, 403, and 405 may each be any computing apparatus, system, device, or collections thereof that employ a computing architecture suitable for implementing information management application 411, 413, or 415 respectively. Computing architecture 300 referred to with respect to FIG. 3 is one such representative architecture. Information management applications 411, 413, and 415 may each be any version or variety of an information management application. Examples include but are not limited to locally installed and executed applications, streaming applications, web-based applications that execute at least in part within the context of a browser application, mobile applications, mobile web-based applications that execute at least in part within the context of a mobile browser application, or any other application type, variation, or combination thereof.

Information management applications 411, 413, and 415 may each be embodied in program instructions that, when executed by application platforms 401, 403, and 415 respectively direct each to operate as described herein for control process 200 discussed with respect to FIG. 2. The program instructions may take the form of compiled object code, interpreted scripts, or any other suitable form of program instructions that may be executed directly or indirectly by an application platform, as well as any suitable variation or combination thereof. Examples of information management applications include but are not limited to Microsoft® Outlook®, Mozilla Thunderbird/Lightening, OpenXchange, Microsoft® Outlook® Web App, Microsoft® Outlook® Web App for mobile device, Outlook.com®, Gmail, and Microsoft® Outlook® for mobile devices, as well as another suitable information management application, variation, or combination thereof.

Service environment 407 and service environment 409 may each include any computing apparatus, system, device, or collections thereof that employ a computing architecture suitable for implementing information exchange service 417 and information exchange service 419 respectively. Computing architecture 300 referred to with respect to FIG. 3 is one such representative architecture. Examples include server computers, cloud computing platforms, data centers, and any physical or virtual computing machine, as well as any variation or combination thereof. Examples of information exchange service 417 and information exchange service 419 include but are not limited to Microsoft® Exchange®, Microsoft® O365®, Hotmail®, Outlook.com®, and Gmail, as well as any other information exchange service, combination, or variation thereof capable of operating as described herein.

In operation, any of applications platforms 401, 403, and 405 may communicate from time to time with service environment 407 or service environment 409 over communication network 410 to facilitate the exchange of information between information management applications 411 and 413 and information exchange service 417 and between information management application 415 and information exchange service 419. Service environment 407 and service environment 409 may also communicate over communication network 410 to facilitate the exchange of information.

Communication between any of the elements contemplated in FIG. 4 may occur in accordance with various communication protocols, such as the Internet protocol (IP, IPv4, IPv6, etc.), the transfer control protocol (TCP), and the user datagram protocol (UDP), as well as any other suitable communication protocol, variation, or combination thereof. Communication network 410 may be representative of a network or collection of networks over which the elements contemplated in FIG. 4 may exchange information, such as an intranet, the Internet, a local area network, a wide area network, a wireless network, a wired network, or any combination or variation thereof. Communication network 410 may include connections, devices, and communication media, such as metal, glass, air, or any other suitable communication media over which information may be exchanged. The aforementioned communication media, networks, connections, protocols, and devices are well known and need not be discussed at length here.

The manner and format in which information is exchanged may vary. In some implementations, an application may exchange information with a service environment and information exchange service in accordance with various protocols, such as IMAP (internet message access protocol), POP (post office protocol), SMTP (simple mail transfer protocol), OWA (Outlook Web App) webmail protocol, various other webmail protocols, various proprietary protocols, HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Figure 7:
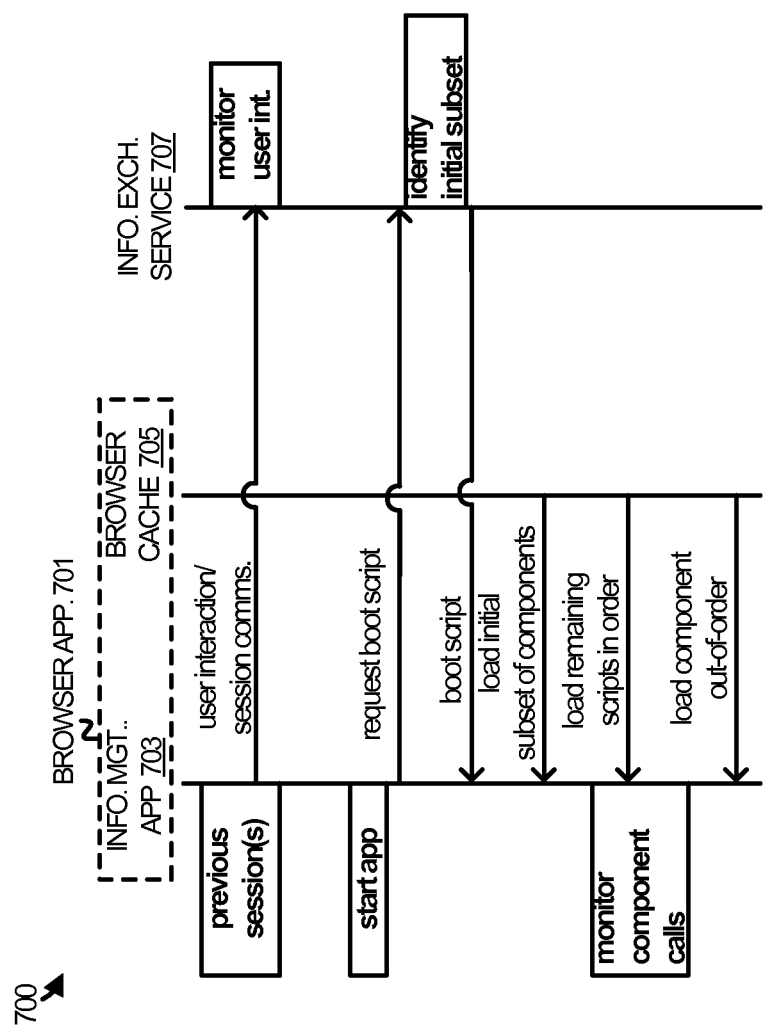
FIG. 7 illustrates an operational sequence in an implementation.
Figure 8:
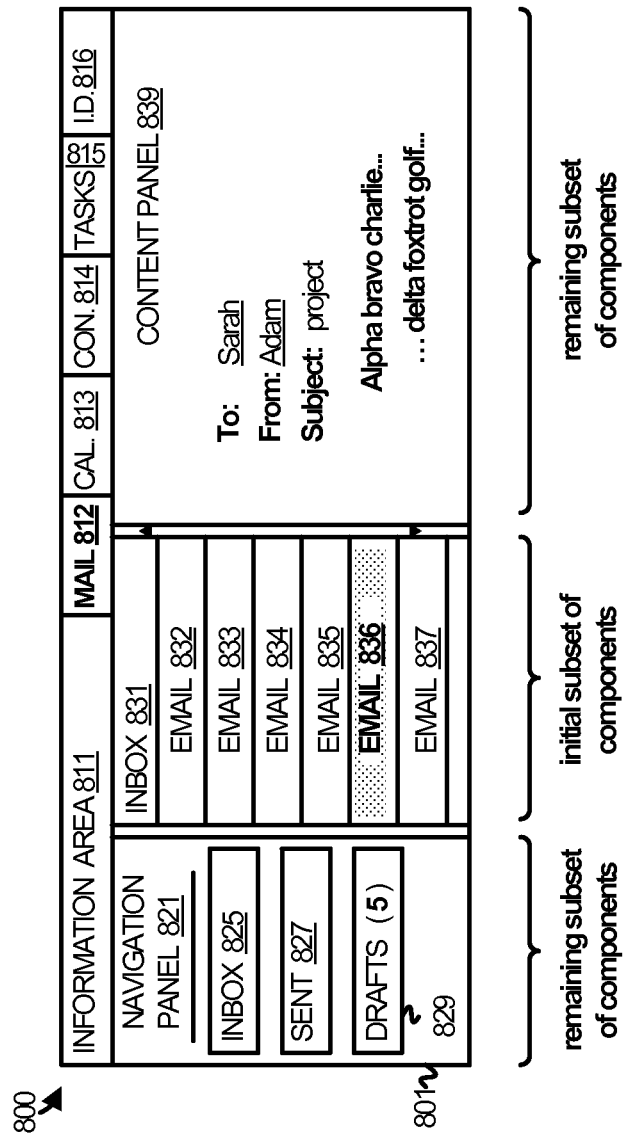
FIG. 8 illustrates an operational scenario in an implementation.
Figure 9:
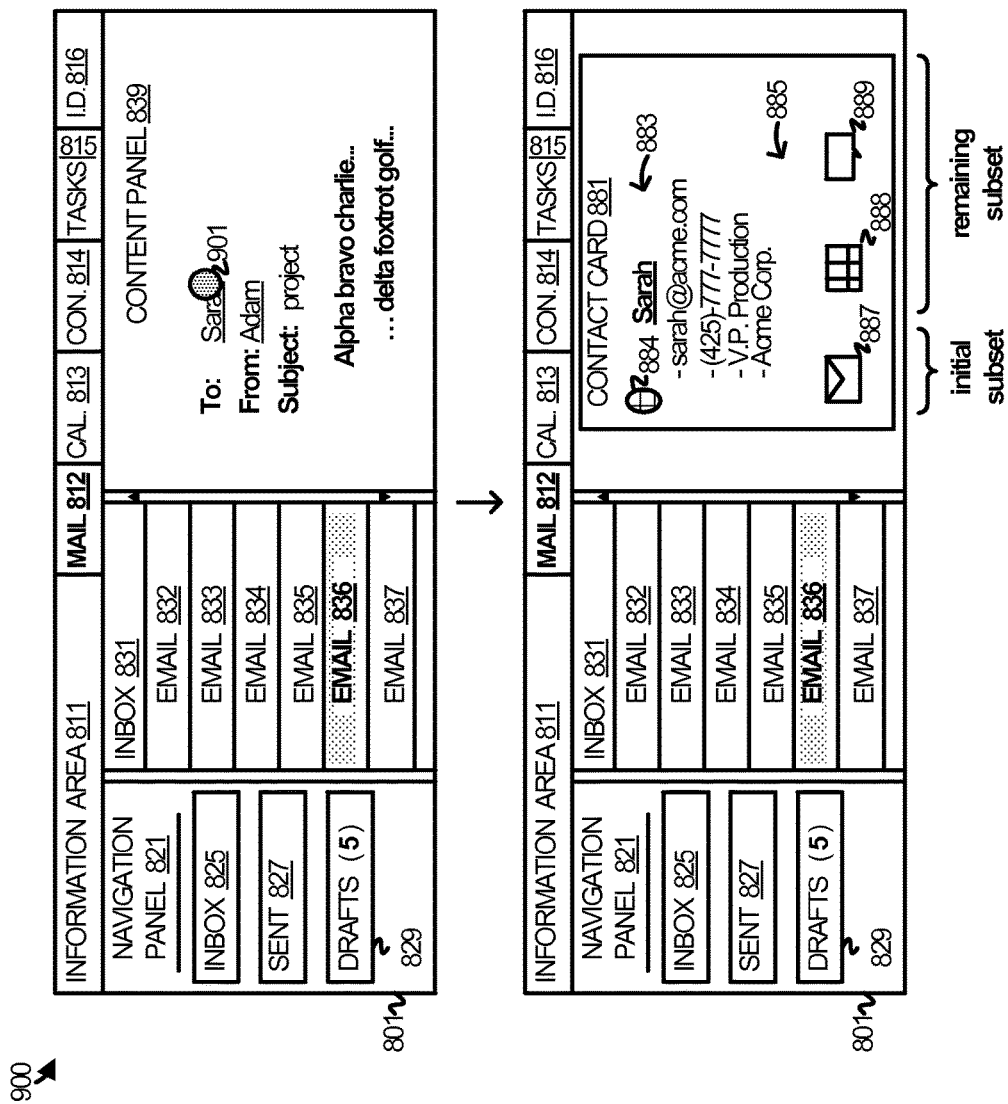
FIG. 9 illustrates an operational scenario in an implementation.

Turning now to FIGS. 5-9, various processes, operational scenarios, and operational sequences illustrate different implementations of some of the principals discussed with respect to FIGS. 1-4 above, as well as some additional concepts. In particular, FIG. 5 illustrates a loading process that may be implemented by an information management application, while FIG. 6 illustrates an exchange process that may be implemented in a service environment. FIG. 7 illustrates an operational sequence, while FIG. 8 and FIG. 9 illustrate two operational scenarios.

Referring now to FIG. 5, a loading process 500 is illustrated, in accordance with which an information management application (411, 413, and 415) may operate when interfacing with an information exchange service (417, 419). In operation, the information management application starts (step 501). This may occur, for example, upon a user navigating to a particular website though which the information exchange service is accessed. In another example, a mobile application may be selected and launched. It may be appreciated that a variety of scenarios are possible for starting the application and may be considered within the scope of the present disclosure.

Upon starting, the information management application communicates with the information exchange service to request a boot script (step 503). The boot script includes information that identifies to the information management application an initial subset of components to load first, prior to loading other components. Upon receiving the boot script, the information management application loads the initial subset of components (step 505), possibly from a browser cache, from a remote server, or from any other source from which the components may be loaded.

After loading the initial subset of the components, the information management application may execute any of the initial subset. In the background, any remaining components are loaded (step 507). The remaining components may be loaded in accordance with a loading order. The loading order may be programmatically defined such that the information management application can load the components sequentially.

While the remaining components are loading in the background, the information management application monitors for any components to be called or invoked (step 509). When a component is invoked, the information management application determines whether or not the component has been loaded yet (step 511). This may be accomplished by, for example, referencing a list of components and their corresponding load state, by monitoring for an error condition that may occur when a component is called that is not yet loaded, or by any other suitable mechanism.

In the event that the called component is not yet loaded, the information management application loads the component out of order with respect to its place in the normal loading order (step 513). If the component is already loaded, then it can execute. Monitoring of the component calls may continue indefinitely or may possibly cease once all of the remaining components are loaded.

FIG. 6 illustrates an exchange process 600 in accordance with which an information exchange service (417, 419) may operate when interfacing with an information management application (411, 413, and 415). In operation, the information exchange service monitors user interaction with respect to the information management application (step 601). For example, the information exchange service may monitor which module of various modules included in the information exchange service a user may interact with the most. In another example, the information exchange service may monitor with which module of the various modules a user tends to interact with first (or the most) relative to the other modules during an initial period of time.

Upon starting, an information management application communicates a request for a boot script to the information exchange service. The information exchange service receives the request (step 603) and, in response to it, identifies an initial subset of components to include in the boot script based on the monitored user interaction (step 605). For example, the components associated with the module used most frequently by a user may be included in the boot script. In another example, the components associated with the module most likely to be interacted with first, as determined based on the monitored interaction, may be included in the boot script.

The information exchange service then communicates the boot script to the information management application (step 607), thereby enabling the information management application to immediately load the initial subset of components. In this manner, the components loaded during an initial period of time are more likely to be relevant to a user interacting with the information management application compared with other solutions where components are loaded in a static, non-user specific manner.

FIG. 7 illustrates an operational sequence 700 to illustrate the various concepts described above in an implementation. Operational sequence 700 involves a browser application 701 within which an information management application 703 may execute. In operation, a user accesses information exchange service 707 during previous sessions in order to, for example, send and receive emails, schedule calendar events, and the like. During the previous sessions, session communications are exchange between information management application 703 and information exchange service 707. In addition, information indicative of user interactions with the information management application 703 may also be communicated to information exchange service 707. Information exchange service 707 monitors the user interactions and stores the information for later analysis when determining which components to include in an initial subset.

Eventually, the information management application 703 is closed as the user may move on to working with other applications or for some other reason. Upon returning to the application, it is started and a request for a boot script is communicated to information exchange service 707. Information exchange service 707 receives the request and responsively identifies an initial subset of components for loading by the information management application. Information exchange service 707 communicates the boot script to the information management application 703, which can then load the components.

Upon receiving the boot script, information management application 703 loads the initial subset of components identified in the boot script from the browser cache 705 or some other suitable component source. For instance, the components may also be loaded from a remote source, such as a server associated with the information exchange service 707.

Once the initial subset of components are loaded, they can be executed within the context of the information management application 703 running in the browser application 701. However, other components may remain that need to be loaded. Accordingly, the remaining components are loaded in the background. While the remaining components are loaded, the information management application 703 monitors for any components to be called that are not yet loaded. In the event a component is called that is not yet loaded, it can be retrieved and loaded from the browser cache 705 or from some other suitable source.

FIG. 8 illustrates in operational scenario 800 how some components associated with a view to an information management application may be included in an initial subset, while other components may be included in a remaining subset. In operational scenario 800, view 801 is representative of a view that may be rendered by one or more of information management applications 411, 413, and 415.

In operational scenario 800, view 801 includes an information area 811 that may be used to display the name of the application or other suitable information. Information area 811 includes several selectable options that, when selected, launch the presentation of other views associated with other modules. In particular, mail option 812 corresponds to an email module, calendar option 813 corresponds to a calendar module, contacts option 814 corresponds to a contacts module, and tasks option 815 corresponds to a tasks module. Information area 811 also includes an identity option 816 representative of an identity of a user engaged with view 801. View 801 may include additional features and some of the features discussed herein may be omitted.

View 801 includes various panels having various email items and other email functionality rendered and available for interaction with a user. For example, navigation panel 821 includes, but is not limited to, various folders that a user may select in order to access their contents, such as an inbox folder 825, a sent folder 827, and a drafts folder 829. Depending upon which folder is selected, its corresponding contents may be displayed in the panel adjacent to navigation panel 821. It is assumed here for exemplary purposes that inbox folder 825 is selected. Accordingly, inbox 831 and its contents are displayed adjacent to navigation panel 821, including emails 832-837. It may be appreciated that the various panels and their contents could be arranged in a variety of ways and are not limited to just those disclosed herein.

Content panel 839 provides a more detailed view of a selected item. For example, content panel includes content associated with email 836, assumed for exemplary purposes to have been selected by a user for reading, editing, or the like. Other aspects may be included in content panel 839, such as in-line reply capabilities, that are well known and need not be discussed at length here.

In operational scenario 800, view 801 may be representative of a view displayed when it is determined that an email module is the most frequently used module of various modules or the module most likely to be used first by a user. Thus, a portion of the components associated with the email module are included in the initial subset of components, rather than components associated with other modules. The portion of the components included in the initial subset are also determined based on past user interaction. In operational scenario 800, it is assumed for exemplary purposes that the user tends to interact first with inbox elements and later with other elements.

For exemplary purposes, it is assumed that mail option 812 has been selected and thus view 801 is representative of a view that may be encountered when working with an email module. In addition, because it has been predicted that the user would select mail option 812 first and interact with elements in inbox 831, most or all of the components in view 801 relevant to the inbox 831 are included in an initial subset of components identified in a boot script to the information management application.

The remaining subset of components that are loaded in the background after having loaded the initial subset may be related to navigation panel 821 and content panel 839. It may occur that the user navigates to an element in navigation panel 821 or content panel that has not yet been loaded. When that occurs, the information management application may load the associated component(s) ahead of its place in a loading order.

It may also be appreciated that, while FIGS. 5-8 and their associated description generally make reference to identifying and loading an initial subset of components upon starting an application, such capabilities may also apply well after an application has started. In fact, such capabilities can be applied at any point during the operation of an application when loading components associated with a view, module, sub-module, or any other aspect of an application. FIG. 9 illustrates one such operational scenario 900 in which a control process is applied well into the operation of an application.

In FIG. 9, operational scenario 900 relates to view 801 from FIG. 8. In operation, view 801 is presented of an email module. A user may navigate to the various elements in view 801, at least some of which are selectable. It is assumed here for exemplary purposes that the contacts listed in content panel 839 ("Sarah" and "Adam") are active contacts that, when selected, results in the display of a contact card associated with that contact.

In operational scenario 900, a user makes an indication of interest 901 with respect to the contact for "Sarah" included in content panel 839, such as by touching, clicking on, gesturing towards, or otherwise indicating their interest. In response to the selection, contact card 881 is displayed. Contact card 881 includes various elements, such as contact information 883, an image 884, and various communication features 885. The communication features 885 include an email feature 887, a calendar feature 888, and a chat feature 889, the selection of any one of which triggers corresponding communication functionality. For example, selecting the email feature 887 launches an email function, selecting the calendar feature 888 launches a calendar function, and selecting the chat feature 889 launches a chat function.

However, in order to display contact card 881 and in order for the user to be able to interact with all of its associated features and functionality, various components must first be loaded that are associated with the various elements in contact card 881. The various components, when executed, provide the features and functionality associated with the elements in contact card 881.

Rather than load all of the components associated with contact card 881 in a static or pre-programmed fashion, a control process is performed to identify a subset of the components to load first, based on past user action with contact card 881. In this manner, various aspects of the feature deemed especially relevant to the user based on his or her past interactions can be loaded before other aspects that may be less likely to be invoked in use.

In operational scenario 900, it may be assumed for exemplary purposes that the user tends to interact with the email feature 887 more than with the calendar feature or the chat feature 889. Accordingly, a component or components associated with the email feature 887 may be identified for inclusion in the initial subset. The components associated with the calendar feature 888 and chat feature 889 may be included in a remaining set of components for loading after the initial subset. In this manner, a user may experience the email feature 887 and its corresponding component(s) may be executed immediately, rather than experiencing a delay as other components associated with less relevant features load.

It may be appreciated from the discussion above that, in at least one implementation, an information management application interfaces with an information exchange service. Upon starting, the information management application communicates a request to the information exchange service to identify an initial subset of various components based at least in part on user interaction with the information management application. In response to the information exchange service identifying the initial subset of components, the application loads the initial subset of the plurality of components into an execution environment.

In some implementations, the information management application communicates information indicative of the user interaction with the information management application to the information exchange service. In at least one scenario, the information may indicate at least with which module of the various modules included in the information management application a user interacts most often relative to others of the various modules. Each of the various modules may include various components. In some scenarios, the initial subset of components is drawn from a group of components associated with one particular module. On other scenarios, the initial subset of components may be drawn from across the various modules. In some scenarios, the information may also indicate at least with which of the various components the user interacts most often relative to others of the plurality of components.

Various execution environments are possible and may include a browser application. Examples of browser applications include but are not limited to desktop versions of browsers, mobile browser applications, browser applications or functionality that may be integrated with an operating system, or any other variation or combination of browser. In such a scenario, the information management application may be a browser-based application and its various components may load from a browser cache.

An improved service environment and its operations are also disclosed herein. In at last one implementation, the service environment facilitates an information exchange service with respect to an information management application. The service environment, in response to the information management application starting in a local environment remote from the service environment, identifies, based at least in part on user interaction with the information management application an initial subset of various components associated with the information management application. The initial subset of components are loaded from a staging environment to the local environment prior to any others of the various components. The service environment communicates to the information management application which of the various components to include in the initial subset.

In some implementations, the service environment monitors the user interaction with the information management application and generates information indicative of the user interaction. The information may indicate, for example, with which module of various modules included in the information management application a user interacts most often relative to others of the plurality of modules. In another example, the information may also indicate at least with which of the various components the user interacts most often relative to others of the various components. In yet another example, the user interaction may relate to prior user behavior, such as an interaction pattern indicative of a frequency of interaction with each of the various application modules.

In at least one implementation, examples of the application modules include but are not limited to an email module, a calendar module, and a contacts module. At least a portion of the initial subset of components may be executed to render a user interface to the information management application, including possibly views of the email module, calendar module, and contacts module, as well as other modules if present.

In an implementation, an information management application includes component that are loaded into a local environment from a staging environment. For example, the components may generally be downloaded from a web server for loading into and execution within a web browser environment or other suitable environment.

While the various implementations described above generally refer to information management applications, it may be appreciated that the various advances described herein within the context of processes, operational scenarios, and other implementations may also be implemented in other types of applications. For example, the advances described herein may be implemented with respect to productivity applications, enterprise applications, gaming applications, and communication applications, as well as any other type of program application.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
one or more computer readable storage media;
at least one processor; and
an information management application for interfacing with an information exchange service and comprising program instructions stored on the one or more computer readable storage media, wherein the program instructions, when executed by the at least one processor, direct the at least one processor to at least:
upon starting the information management application, communicate a request for a boot script to the information exchange service to identify an initial subset of a plurality of components to include in the boot script based at least in part on user interaction patterns with the information management application;
in response to the information exchange service identifying the initial subset of the plurality of components, load the initial subset of the plurality of components into an execution environment; and
attempt to load each of a remaining subset of the plurality of components in accordance with a loading order and load any component not yet loaded but invoked by another component ahead of a corresponding place in the loading order.

2. The computing apparatus of claim 1 wherein the program instructions further direct the at least one processor to communicate information indicative of the user interaction with the information management application to the information exchange service.

3. The computing apparatus of claim 2 wherein the information indicates at least with which module of a plurality of modules included in the information management application a user interacts most often relative to others of the plurality of modules.

4. The computing apparatus of claim 3 wherein the module includes the plurality of components and wherein the information further indicates at least with which of the plurality of components the user interacts most often relative to others of the plurality of components.

5. The computing apparatus of claim 1 wherein the execution environment comprises a browser application that, when executed by the at least one processor, processes at least a portion of the initial subset of the plurality of components to render a user interface to the information management application in a manner associated with the user interaction.

6. The computing apparatus of claim 1 further comprising the at least one processor coupled with the one or more computer readable storage media and configured to execute the program instructions.

7. The computing apparatus of claim 1, wherein the information management application is an email application.

8. A method of operating a service environment to facilitate an information exchange service with respect to an information management application, the method comprising:
in response to the information management application starting in a local environment remote from the service environment receiving a request for a boot script for identifying, based at least in part on user interaction patterns with the information management application, an initial subset of a plurality of components associated with the information management application to include in the boot script and load from a staging environment to the local environment prior to a remaining subset of the plurality of components in accordance with a loading order; and
communicating to the information management application the boot script, where the boot script indicates which of the plurality of components to include in the initial subset of the plurality of components for loading into the local environment and the loading order for the remaining subset of the plurality of components, where any component not yet loaded but invoked by another component is loaded ahead of a corresponding place in the loading order.

9. The method of claim 8 further comprising monitoring the user interaction with the information management application and generating information indicative of the user interaction.

10. The method of claim 9 wherein the information indicates at least with which module of a plurality of modules included in the information management application a user interacts most often relative to others of the plurality of modules.

11. The method of claim 10 wherein the module includes the plurality of components and wherein the information further indicates at least with which of the plurality of components the user interacts most often relative to others of the plurality of components.

12. The method of claim 11 wherein the plurality of application modules comprises an email module, a calendar module, and a contacts module.

13. The method of claim 8 wherein at least a portion of the initial subset of the plurality of components comprises components that, when processed by a browser application, direct the browser application to render a user interface to the information management application in a manner associated with the user interaction.

14. The method of claim 8 wherein the local environment comprises a browser application, wherein the information management application comprises a browser-based application, and wherein the staging environment comprises a browser cache associated with the browser application or a server in the service environment.

15. One or more computer readable storage media having stored thereon an information management application comprising program instructions executable by a processing system, the program instructions comprising:
a plurality of components that when executed by the processing system directs the processing system to at least communicate requests to invoke other components of the plurality of components; and
a control component that when executed by the processing system directs the processing system to at least:
load an initial subset of the plurality of components into an execution environment prior to loading at least a remaining subset of the plurality of components into the execution environment in accordance with a loading order; and
responsive to the requests, determine whether or not a component identified by the requests has already been loaded into the execution environment or is yet to be loaded into the execution environment, invoke the component when already loaded and, when not yet loaded, load the component ahead of a place for the component in the loading order.

16. The one or more computer readable storage media of claim 15 wherein the information management application comprises a plurality of application modules and wherein the program instructions further comprise a manager component that when executed by the processing system directs the processing system to identify, based at least in part on user behavior, the initial subset of the plurality of components to load into the execution environment.

17. The one or more computer readable storage media of claim 16 wherein the user behavior comprises prior user behavior with respect to the plurality of application modules.

18. The one or more computer readable storage media of claim 17 wherein the prior user behavior comprises an interaction pattern indicative of a frequency of interaction with each of the plurality of application modules.

19. The one or more computer readable storage media of claim 16 wherein the plurality of application modules comprises an email module, a calendar module, and a contacts module.

20. The one or more computer readable storage media of claim 19 wherein the execution environment comprises a browser application, wherein the information management application comprises a browser-based application, and wherein the plurality of components load from a browser cache associated with the browser application.

* * * * *